US010120060B2

(12) United States Patent
Jain et al.

(10) Patent No.: US 10,120,060 B2
(45) Date of Patent: Nov. 6, 2018

(54) LOCATION DETERMINATION USING USER EQUIPMENT PRECONFIGURED WITH POSITIONING REFERENCE SIGNAL INFORMATION

(71) Applicant: QUALCOMM Incorporated, San Diego, CA (US)

(72) Inventors: Amit Jain, San Diego, CA (US); Dinesh Subramani, San Diego, CA (US); Gautam Nirula, San Diego, CA (US)

(*) Notice: Subject to any disclaimer, the term of this patent is extended or adjusted under 35 U.S.C. 154(b) by 0 days.

(21) Appl. No.: 15/423,526

(22) Filed: Feb. 2, 2017

(65) Prior Publication Data
US 2018/0217224 A1 Aug. 2, 2018

(51) Int. Cl.
| | |
|---|---|
| *G01S 5/02* | (2010.01) |
| *H04L 5/00* | (2006.01) |
| *H04B 1/3816* | (2015.01) |
| *H04L 29/08* | (2006.01) |
| *H04W 64/00* | (2009.01) |
| *G01S 19/13* | (2010.01) |

(Continued)

(52) U.S. Cl.
CPC .............. *G01S 5/0263* (2013.01); *G01S 1/20* (2013.01); *G01S 5/0221* (2013.01); *G01S 5/0236* (2013.01); *G01S 5/06* (2013.01); *G01S 5/10* (2013.01); *G01S 19/13* (2013.01); *H04B 1/3816* (2013.01); *H04L 5/0048* (2013.01); *H04L 67/34* (2013.01); *H04W 64/00* (2013.01); *H04W 64/003* (2013.01)

(58) Field of Classification Search
CPC ... H04W 24/00; H04W 64/003; G01S 5/0263; G01S 19/13; G01S 5/0236; H04L 5/0048; H04L 67/34; H04B 1/3816

USPC ............. 455/456.1, 404.1–2, 8, 9, 501, 515; 370/331, 332, 328, 329
See application file for complete search history.

(56) References Cited

U.S. PATENT DOCUMENTS

| | | | |
|---|---|---|---|
| 9,742,542 B2* | 8/2017 | Yoon ..................... | H04L 5/0051 |
| 2011/0149903 A1* | 6/2011 | Krishnamurthy ..... | H04L 5/0007 370/330 |

(Continued)

FOREIGN PATENT DOCUMENTS

WO    WO-2015145217 A1    10/2015

OTHER PUBLICATIONS

Fischer S., "Observed Time Difference of Arrival (OTDOA) Positioning in 3GPP LTE", Jun. 6, 2014 (Jun. 6, 2014), 62 Pages, XP055284784, Retrieved from the Internet: URL: http://www.terranautx.com/s/Qualcomm-OTDOA-positioning-in-LTE-June-2014.pdf.

(Continued)

*Primary Examiner* — Congvan Tran
(74) *Attorney, Agent, or Firm* — Thien T. Nguyen

(57) ABSTRACT

A user equipment (UE) is preconfigured with Positioning Reference Signal (PRS) configurations for a plurality of base stations. The UE receives a base station almanac including position information and identifies of local base stations. Using the PRS configurations and information from the base station almanac, the UE receives PRS signals from a first set of base stations. The UE may also receive cell-specific reference signals (CRS) from a second set of base stations. The UE performs location determination for the user equipment using the PRS signals from the first set of base stations, the CRS signals from the second set of base stations.

30 Claims, 5 Drawing Sheets

(51) Int. Cl.
  *G01S 1/20* (2006.01)
  *G01S 5/06* (2006.01)
  *G01S 5/10* (2006.01)

(56) References Cited

U.S. PATENT DOCUMENTS

| | | | |
|---|---|---|---|
| 2012/0015667 A1* | 1/2012 | Woo | G01S 5/0221 |
| | | | 455/456.1 |
| 2013/0040673 A1* | 2/2013 | Siomina | G01S 5/0226 |
| | | | 455/501 |
| 2013/0237247 A1 | 9/2013 | Lee et al. | |
| 2013/0315168 A1* | 11/2013 | Frank | G01S 5/0205 |
| | | | 370/329 |
| 2014/0148198 A1 | 5/2014 | Siomina et al. | |
| 2014/0256348 A1 | 9/2014 | Wirola et al. | |
| 2015/0071092 A1 | 3/2015 | Mirbagheri et al. | |
| 2015/0094091 A1 | 4/2015 | Stern-Berkowitz et al. | |
| 2015/0119066 A1 | 4/2015 | Chiou et al. | |
| 2015/0215729 A1* | 7/2015 | Opshaug | H04B 7/0802 |
| | | | 455/456.1 |
| 2015/0323645 A1* | 11/2015 | Siomina | H04W 24/10 |
| | | | 455/456.1 |
| 2016/0156424 A1 | 6/2016 | Mirbagheri et al. | |
| 2018/0097596 A1* | 4/2018 | Palanivelu | H04L 5/0005 |

OTHER PUBLICATIONS

International Search Report and Written Opinion—PCT/US2017/066036—ISA/EPO—dated Mar. 28, 2018.

* cited by examiner

LOCATION DETERMINATION USING USER EQUIPMENT PRECONFIGURED WITH POSITIONING REFERENCE SIGNAL INFORMATION

BACKGROUND

Background Field

The subject matter disclosed herein relates to wireless communications systems, and more particularly to methods and apparatuses for location determination of a user equipment in a wireless communications system.

Relevant Background

Obtaining accurate position information for user equipment, such as cellular telephones or other wireless communication devices, is becoming prevalent in the communications industry. A common means to determine the location of a device is to use a satellite positioning system (SPS), such as the well-known Global Positioning Satellite (GPS) system or Global Navigation Satellite System (GNSS), which employ a number of satellites that are in orbit around the Earth.

Location determination using an SPS is accurate, but sometimes is not available or desired, e.g., for indoors or areas with poor satellite signal reception. Other means commonly used to determine the location of a device includes terrestrial based positioning. During terrestrial based positioning, measurements of signals from nearby transmitters, such as cellular base stations (towers) may be made and used to determine a position of the user equipment.

SUMMARY

A user equipment (UE) is preconfigured with Positioning Reference Signal (PRS) configurations for a plurality of base stations. The UE receives a base station almanac including position information and identifies of local base stations. Using the PRS configurations and information from the base station almanac, the UE receives PRS signals from a first set of base stations. The UE may also receive cell-specific reference signals (CRS) from a second set of base stations. The UE performs location determination for the user equipment using the PRS signals from the first set of base stations, the CRS signals from the second set of base stations.

In one implementation, a method of performing location determination includes preconfiguring a user equipment with Positioning Reference Signal (PRS) configurations for a plurality of base stations within at least one wireless communication network; receiving from a location server a base station almanac including position information and identification of local base stations; using the PRS configurations and information from the base station almanac to receive PRS signals from a first set of base stations; receiving cell-specific reference signals (CRS) from a second set of base stations; and performing location determination for the user equipment using the PRS signals from the first set of base stations, the CRS signals from the second set of base stations.

In one implementation, a user equipment for performing location determination includes a memory preconfigured with Positioning Reference Signal (PRS) configurations for a plurality of base stations within at least one wireless communication network; a cellular transceiver configured to wirelessly communicate with base stations; and at least one processor coupled to the memory and the cellular transceiver, the at least one processor configured to receive from the cellular transceiver a base station almanac transmitted by a location server, the base station almanac including position information and identification of local base stations, use the PRS configurations and information from the base station almanac to receive PRS signals from a first set of base stations with the cellular transceiver, receive cell-specific reference signals (CRS) from a second set of base stations with the cellular transceiver, and perform location determination using the PRS signals from the first set of base stations, the CRS signals from the second set of base stations.

In one implementation, a user equipment for performing location determination includes means for preconfiguring the user equipment with Positioning Reference Signal (PRS) configurations for a plurality of base stations within at least one wireless communication network; means for receiving from a location server a base station almanac including position information and identification of local base stations; means for using the PRS configurations a and information from the base station almanac to receive PRS signals from a first set of base stations; means for receiving cell-specific reference signals (CRS) from a second set of base stations; and means for performing location determination for the user equipment using the PRS signals from the first set of base stations, the CRS signals from the second set of base stations.

In one implementation, a non-transitory computer-readable medium for performing location determination by a user equipment, wherein the user equipment is preconfigured with Positioning Reference Signal (PRS) information for a plurality of base stations within at least one wireless communication network, the non-transitory computer-readable medium including program code for receiving from a location server a base station almanac including position information and identification of local base stations; program code for using the PRS configurations and information from the base station almanac to receive PRS signals from a first set of base stations; program code for receiving cell-specific reference signals (CRS) from a second set of base stations; and program code for performing location determination for the user equipment using the PRS signals from the first set of base stations, the CRS signals from the second set of base stations.

BRIEF DESCRIPTION OF THE DRAWING

Non-limiting and non-exhaustive aspects are described with reference to the following figures, wherein like reference numerals refer to like parts throughout the various figures unless otherwise specified.

DETAILED DESCRIPTION

Figure 1:
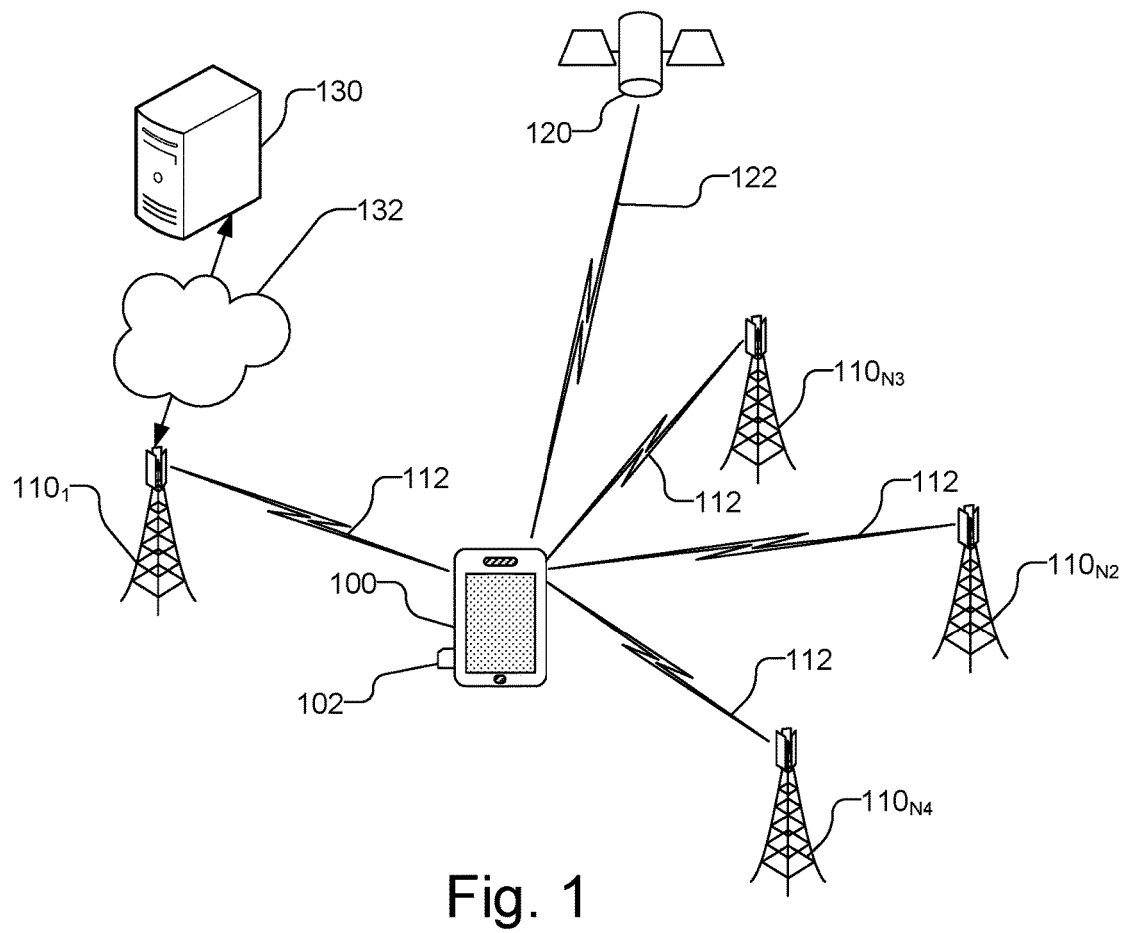
FIG. 1 is a simplified diagram illustrating a wireless communication system including user equipment is preconfigured with positioning reference signal (PRS) information for a plurality of base stations.

FIG. 1 is a simplified diagram illustrating a wireless communication system in which user equipment (UE) 100 is capable of wireless communication with a number of base stations $110_{N1}$, $110_{N2}$, $110_{N3}$, and $110_{N4}$ (sometimes collectively referred to as base stations 110), as illustrated by links 112, which may be part of a cellular communication network. The UE 100 is preconfigured with positioning reference signal (PRS) configurations for the base station 110 with which the UE 100 may receive PRS signals from the base station 110 which may be used for location determination of the UE, e.g., time of arrival (TOA), time difference of arrival (TDOA) or observed time difference of arrival (OTDOA) positioning solutions.

As illustrated in FIG. 1, the UE 100 may be capable of receiving signals 122 from a Satellite Positioning System (SPS) satellite 120 with which location determination of the UE 100 may be performed. Typically, SPS positioning uses signals from four or more SPS satellites 120, which may be belong to a Global Navigation Satellite System (GNSS) including Global Positioning System (GPS), Galileo, GLONASS or COMPASS or a non-global system, such as QZSS.

The UE 100 may communicate, e.g., through base station 110 and network 132, with a separate location server 130 to receive positioning assistance data, such as a base station almanac including the identities and locations of local base stations 110. For example, the UE 100 may communicate with the location server 130 providing information with which an approximate position of the UE 100 may be determined, such as the identity of the base station $110_{N1}$ with which the UE 100 is communicating, i.e., the serving base station, or a recent position fix for the UE 100. In response, the location server 130 may provide the base station almanac listing the identities and locations of local base stations 110, i.e., base stations from which the UE 100 may be able to receive wireless signals, including the serving base station $110_{N1}$. Additionally, if desired, SPS assistance data may be transmitted to the UE 100. As the UE 100 is preconfigured with the PRS configurations for the base stations, the assistance data provided by the location server 130 does not include the PRS configurations for the base stations. By avoiding the need to transmit PRS configurations in assistance data from the location server 130 to the UE 100, the data overhead for sending assistance data from the network to the device is reduced.

With the PRS configurations for the base stations 110 with which the UE 100 is preconfigured, and information from the base station almanac for local base stations 110 received from the location server, the UE 100 may receive the PRS signals from local base stations 110. The UE 100 may also receive other types of signals from the local base stations including the cell-specific reference signals (CRS). In general, PRS signals have better detectability and sensitivity than CRS signals because PRS signals are designed for positioning and are specific to each base station. Accordingly, the PRS signals and the CRS signals may be received from different sets of base stations. For example, the CRS signals may be received from one or more base stations for which the UE 100 does not have PRS configurations, and thus, the PRS signals and CRS signals may be received from different base stations. By way of example, if the UE 100 has PRS configurations for base stations base stations $110_{N1}$, $110_{N2}$, and $110_{N3}$, but not base station $110_{N4}$, the UE 100 may receive PRS signals from base stations $110_{N1}$, $110_{N2}$, and $110_{N3}$ and receive CRS signals from base station $110_{N4}$. In another example, the CRS signals may be received from only a subset of the base stations from which the PRS signals are received. The PRS signals are superior for ranging compared to CRS signal, and thus, receiving CRS signals from a subset of base stations from which the PRS signal are received may be useful if the UE 100 is unable to perform ranging with the PRS signals, e.g., if the UE 100 is too close to the base station or there are any other PRS setting related issue which may cause a PRS ranging failure.

With the location related measurements, e.g., the PRS signals and CRS signals and SPS signals (if received), the UE 100 (or the location server 130) may determine a location estimate for UE 100 using any one of several position methods such as, for example, GNSS, Assisted GNSS (A-GNSS), Advanced Forward Link Trilateration (AFLT), Observed Time Difference Of Arrival (OTDOA) or Enhanced Cell ID (E-CID) or combinations thereof. In some of these techniques (e.g. A-GNSS, AFLT and OTDOA), pseudoranges, time of arrival, or timing differences may be measured at UE 100 relative to three or more terrestrial transmitters or relative to four or more satellites with accurately known orbital data, or combinations thereof, based at least in part, on pilots, positioning reference signals (PRS) or other positioning related signals transmitted by the transmitters or satellites and received at UE 100. For example, the PRS signals and CRS signals may be used to determine a time of arrival (TOA) of signals from local base stations 110, which may be used to provide a distance between the UE 100 and the base stations. In the case of OTDOA, UE 100 may measure a Reference Signal Time Difference (RSTD) between signals such as PRS signals or CRS signals transmitted by local base stations 110. An RSTD measurement may provide the time of arrival difference between signals (e.g. CRS or PRS) received at UE 100 from two different transceivers, e.g., between signals received from a reference base station $110_1$ (typically the serving base station) and neighbor base station $110_{N2}$. In some implementations of OTDOA, the signals used for RSTD measurements (e.g. PRS or CRSA signals) may be accurately synchronized by the transceivers to a common universal time such as GPS time or Coordinated Universal Time (UTC), e.g., using a SPS receiver at each transceiver to accurately obtain the common universal time. The UE 100 (or location server 130) may use the location related measurements along with the known locations of the base stations to compute an estimated location for UE 100.

It should be understood that OTDOA is a positioning method used with Universal Terrestrial Radio Access Network (UTRAN) or Evolved UMTS (Universal Mobile Telecommunications System) Terrestrial Radio Access Network (E-UTRAN), in which a mobile stations is referred to as user equipment and a base station is referred to as an eNodeB, and the location server is referred to as an enhanced serving mobile location center (E-SMLC). The disclosure herein, however, is not limited to UTRAN or E-UTRAN, but may be used with comparable location related measurements performed by the UE 100 in other radio access networks.

Moreover, the UE 100 may be any electronic device capable of wireless communications and receiving PRS signals. The UE 100 may be referred to as a device, a wireless device, a mobile terminal, a terminal, a mobile station (MS), a mobile device, a SUPL Enabled Terminal (SET) or by some other name and may correspond to (or be part of) a smart watch, digital glasses, and fitness monitor, smart cars, smart appliances, cellphone, smartphone, laptop, tablet, PDA, tracking device, control device, or some other portable or moveable device. A UE 100 may comprise a single entity or may comprise multiple entities such as in a personal area network where a user may employ audio, video and/or data I/O devices and/or body sensors and a separate wireline or wireless modem. Typically, though not necessarily, a UE 100 may support wireless communication such as using GSM, Code Division Multiple Access (CDMA), Wideband CDMA (WCDMA), LTE, High Rate Packet Data (HRPD), IEEE 802.11 WiFi, Bluetooth® (BT), WiMax, etc. A UE 100 may also support wireless communication using a wireless LAN (WLAN), Digital Subscriber Line (DSL) or packet cable for example. Although FIG. 1 shows only one UE 100, there may be many other UEs that can each correspond to UE 100.

The UE 100 may enter a connected state with a wireless communication network that may include the network 132. In one example, UE 100 may communicate with a cellular communication network by transmitting wireless signals to, or receiving wireless signals from a cellular transceiver, such as base station $110_{N1}$. The network 132 may include one or more additional base stations. The base station $110_{N1}$ provides user and control planes protocol terminations toward the UE 100. The base stations 110 may also be referred to as an evolved Node B, a base transceiver station, a radio base station, a radio transceiver, a radio network controller, a transceiver function, a base station subsystem (BSS), an extended service set (ESS), some other suitable terminology. The UE 100 also may transmit wireless signals to, or receive wireless signals from a local transceiver, such as an access points (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth network) or a cellular network (e.g. an LTE network or other wireless wide area network such as those discussed in the next paragraph). Of course it should be understood that these are merely examples of networks that may communicate with a mobile device over a wireless link, and claimed subject matter is not limited in this respect.

Examples of network technologies that may support wireless communication including Global System for Mobile Communications (GSM), Code Division Multiple Access (CDMA), Wideband CDMA (WCDMA), Long Term Evolution LTE), High Rate Packet Data (HRPD). GSM, WCDMA and LTE are technologies defined by 3GPP. CDMA and HRPD are technologies defined by the 3rd Generation Partnership Project 2 (3GPP2). WCDMA is also part of the Universal Mobile Telecommunications System (UMTS) and may be supported by an HNB. Cellular transceivers, such as base stations 110 may comprise deployments of equipment providing subscriber access to a wireless telecommunication network for a service (e.g., under a service contract). Here, a cellular transceiver may perform functions of a cellular base station in servicing subscriber devices within a cell determined based, at least in part, on a range at which the cellular transceiver is capable of providing access service.

Conventionally, because the PRS configuration is specific to each base station, a location server provides to a UE assistance data, e.g., OTDOA assistance data, that includes the PRS configuration for each base station and when the to-be-measured PRS signals are expected to arrive at the UE. Without the knowledge of when the to-be-measured PRS signals are expected to arrive and without knowledge of the specific PRS configuration, the user equipment would be unable to receive the PRS signals.

Conventionally, for example, the location server determines the reference base station based on the serving base station for the user equipment and provides to the user equipment OTDOA assistance data that includes the PRS configuration for the reference base station. The PRS configuration for the reference base station provided in OTDOA assistance data from the location server conventionally includes an identifier for the base station, such as the Physical Cell ID (PCI), and may include other identifiers, such as a Cell Global ID, as well as a Channel Number such as the EUTRA Absolute Radio Frequency Channel Number (EARFCN), an Antenna Port Configuration, the Cyclic Prefix (CP) length, and PRS information, which defines the PRS configuration of the cell, if the PRS is configured on the reference cell. Additionally, conventionally the location server determines neighbor base stations, i.e., base stations that are near the reference base station, and provides to the user equipment OTDOA assistance data that includes the PRS configuration for a number of neighbor base stations. The PRS configuration for the neighbor base stations provided in the OTDOA assistance data from the location server conventionally includes identifiers for the base stations, such as the Physical Cell ID (PCI) as well as the expected RSTD and the expected RSTD uncertainty. Additionally, the PRS configuration for the neighbor base stations may include other identifiers, such as a Cell Global ID, as well as a Channel Number such as the EUTRA Absolute Radio Frequency Channel Number (EARFCN), an Antenna Port Configuration, the Cyclic Prefix (CP) length, PRS information, which defines the PRS configuration of the cell, if the PRS is configured on the reference cell, a Slot Number offset, and PRS Subframe Offset.

The PRS information that may be conventionally provided in the OTDOA assistance data allows the user equipment to determine the PRS configuration and the PRS schedule for the reference base station and neighbor base stations. The PRS information for example, includes, e.g., the PRS bandwidth, a PRS Configuration Index, the number of PRS DL frames, and may include muting information if muting is used.

Conventionally, the expected RSTD and the expected RSTD uncertainty provided in the OTDOA assistance data by the location server is based on a rough a-priori location of the user equipment that may be determined from, e.g., Cell-ID or Enhanced Cell-ID positioning. With a rough position of the user equipment, neighbor base stations for RSTD measurements may be selected by the location server. Using the rough position of the user equipment and the known locations of each neighbor base station, the location server may calculate an expected RSTD value (and uncertainty) associated with each neighbor base station.

The use of PRS signals for RSTD measurements is advantageous as PRS signals have better detectability and sensitivity compared to CRS signals. Unfortunately, conventionally obtaining the OTDOA assistance data from a location server requires significant resources. To reduce the data overhead required to send the OTDOA assistance data from the network to the user equipment, it is desirable to remove the need for the OTDOA assistance data from the network to the user equipment during an LPP call flow. Moreover, by eliminating the need for the OTDOA assistance data from the network to the user equipment, an early search may be started by the user equipment thereby improving the overall position fix quality and response time.

Based on field testing and systems studies, it has been determined that PRS configurations are static for a given network and, accordingly, a user equipment may be easily preconfigured with the PRS configurations, thereby eliminating the need for OTDOA assistance data from the network to the user equipment.

Accordingly, the UE 100 is preconfigured with the PRS configurations for a plurality of base stations so that OTDOA assistance data from the network to the UE 100 is not necessary during an LPP call flow. The UE 100 may be preconfigured with the PRS configurations, e.g., by storing the PRS configurations on the UE 100 such as in a subscriber identify module (SIM) card 102, shown in FIG. 1. If desired, the UE 100 may be preconfigured with the PRS configurations by storing the PRS configurations in other storage elements in the UE 100. The UE 100, for example, may be preconfigured with PRS configurations for multiple carriers and their specific settings. Additionally, the UE 100 may be preconfigured with PRS configurations that include muting information, e.g., the PRS muting pattern based on PCI number. The inclusion of muting information in the PRS configurations preconfigured into the UE 100 is advantageous as it enables the UE 100 to detect PRS signals that use muting without receiving OTDOA assistance data. Moreover, preconfiguring the UE 100 with the PRS configurations, including muting information, is advantageous over other methods of determining PRS configurations, such as scanning a network, which is time consuming and will not work if PRS signals are muted.

The PRS configurations may be stored in the UE 100, e.g., by indexing by mobile country code (MCC) and mobile network code (MNC) for multiple carriers. The UE 100 may receive a base station almanac in assistance data from the location server 130 identifying base stations that are in the local area of the UE 100. For example, the base station almanac may include information about base stations near the serving base station of the UE 100. Knowing the current MNC during a positioning session, the UE 100 may search for nearby base stations having preconfigured PRS configurations stored in the UE 100, thereby removing the need for assistance data that includes the PRS configurations from a location server.

By preconfiguring the UE 100 with the PRS configurations for multiple base stations, the UE 100 may perform location related measurements, e.g., time of arrival or time difference of arrival type measurements using PRS signals for better detectability and sensitivity, while avoiding the data overhead necessary for sending assistance data that includes the PRS configurations from the location server 130 to the UE 100. Moreover, with the PRS configurations stored on the UE 100, the UE may start searching for PRS signals from base stations early in a positioning session, or before a positioning session is initiated with a location server, thereby further optimizing the overall fix quality and response time.

The PRS configurations stored on the UE 100 may include information for the UE 100 to determine the PRS schedule for base stations. For example, the PRS configurations with which the UE 100 is preconfigured may include the PRS bandwidth, a PRS Configuration Index, the number of PRS DL frames, for each base station and may also include muting information if muting is used. The PRS Configuration Index may be used to derive the PRS periodicity $T_{PRS}$ of positioning occasions, e.g., the pre-defined positioning subfames grouped by several consecutive subframes $N_{PRS}$, and the PRS subframe offset $\Delta_{PRS}$, which defines the starting subframe of the PRS transmission. The number of PRS DL frames specifies the number of consecutive subframes $N_{PRS}$. Determining the PRS transmission schedule using the PRS Configuration Index and number of PRS DL frames is known to those skilled in the art and is described, e.g., in 3GGPP TS 36.211: "Evolved Universal Terrestrial Radio Access (E-UTRA); Physical Channels and Modulation."

Figure 2:
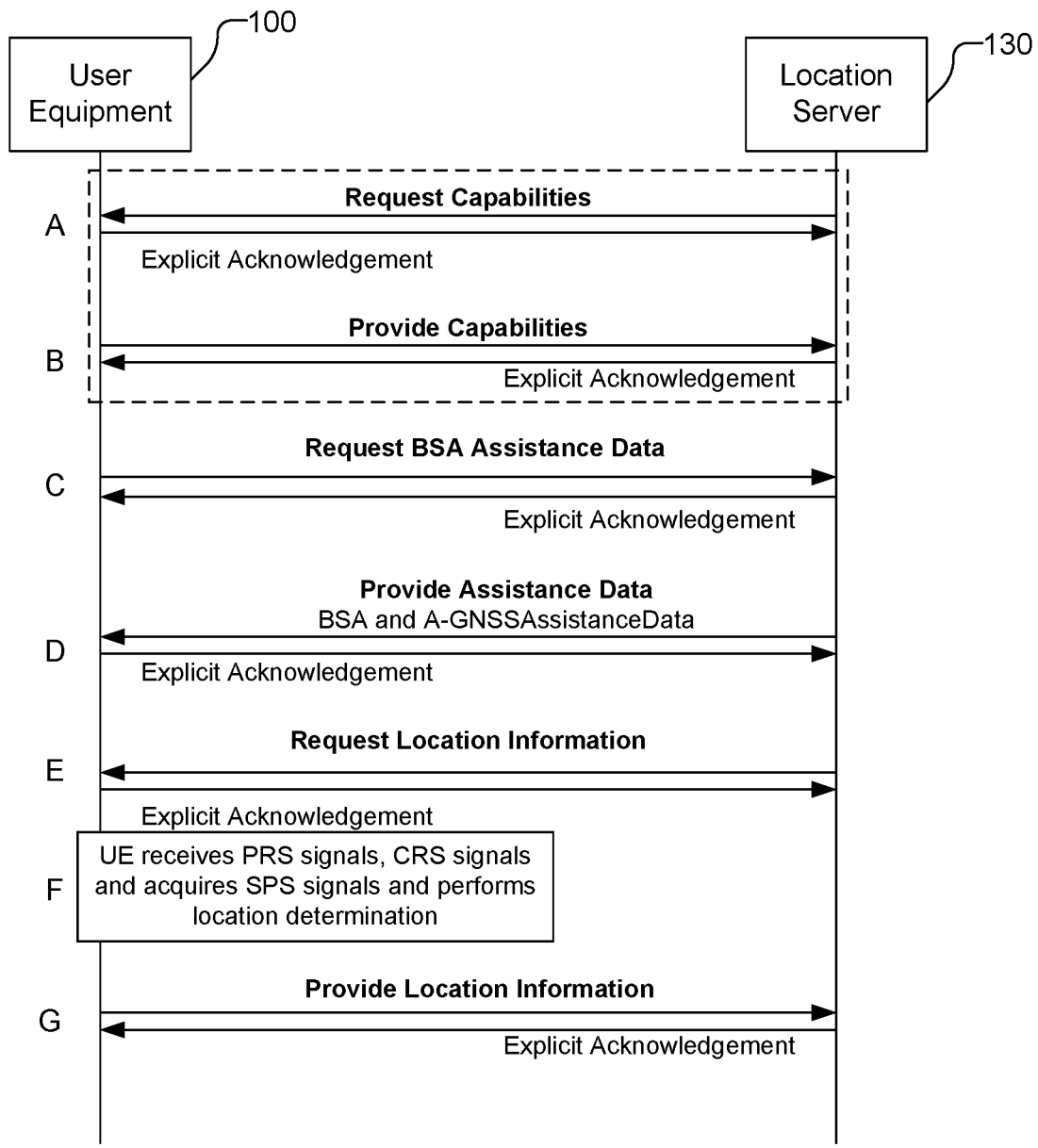
FIG. 2 illustrates an example of a call flow for a location determination session with user equipment preconfigured with PRS configurations for base stations and a location server.

FIG. 2, by way of example, illustrates an example of a call flow for a location determination session with UE 100 and location server 130. As illustrated, in step A, the location server may send a RequestCapabilities message to the UE 100 to indicate the type of capabilities needed, and in response an explicit acknowledgement may be provide by the UE 100 to the location server 130. In step B, the UE 100 may respond with a ProvideCapabilities message to the location server 130, which may include includes information elements such as OTDOA mode supported, and an explicit acknowledgment may be returned by the location server 130. Steps A and B may be optional.

In step C, the UE 100 may request base station almanac (BSA) assistance data, which is explicitly acknowledged by the UE 100. The request for BSA assistance data may include a rough position estimate for the UE 100, e.g., in the form of the Cell ID of the serving base station or other information from which the approximate location of the UE 100 may be determined. The request for assistance data may additionally include a request for A-GNSS assistance data, if an A-GNSS/OTDOA Hybrid mode for location determination is to be used. In step D, the location server 130 sends a Provide Assistance Data message that includes the base station almanac that includes the position information and identification of local base stations, e.g., base stations that are determined to be local to the UE 100 based on the identity of the serving cell base station, and A-GNSS assistance data to the UE 100, which is explicitly acknowledged by the UE 100. Thus, the Provide Assistance Data message may include, e.g., A-GNSS assistance data as well as a base station almanac, but does not include assistance data that includes PRS configurations for the base stations such as OTDOA assistance data. Multiple Provide Assistance Data messages may be required for delivery of the assistance data. It should be understood that the use of an A-GNSS/OTDOA hybrid mode is provided by way of example. If location determination is to be performed without A-GNSS, there would be no need for the A-GNSS assistance data in the Provide Assistance Data in step D, and only the base station almanac may be provided to the UE 100 in the Provide Assistance Data by the location server 130.

In step E, the location server 130 sends a Request Location Information message to the UE 100, e.g., requesting the location of the UE 100, which is explicitly acknowledged by the UE 100. As illustrated in step F, the UE 100 receives PRS signals from local base stations using the PRS configurations stored in the UE 100 and information from the base station almanac, such as the identification of local base stations, provided in step D. The UE 100 further may receive CRS signals and may acquire SPS signals, using the A-GNSS assistance data provided in step D. The UE 100 may perform the location determination based on the received PRS signals, CRS signals, and SPS signals in step F. In step G, the UE 100 may return the determined location to the location server 130.

If desired, the location server 130 may determine the location of the UE 100. In such an embodiment, the location server 130 may determine the mode to be used for positioning, e.g., the location server 130 may choose the A-GNSS/OTDOA Hybrid, and provide the base station almanac and A-GNSS assistance data in step D without the UE 100 specifically requesting A-GNSS assistance data in step C. Additionally, in step F, the UE 100 may receive PRS signals, CRS signals, and SPS signals, and may perform RSTD measurements using the PRS signals and CRS signals. The RSTD measurements and SPS measurements from UE 100 may be provided to the location server 130 as location information in step G, and the location server 130 may determine the location of the UE 100. The RSTD measurement information provided to the location server 130 may include, e.g., the identity of the reference base station and neighbor base stations, as well as the associated RSTD measurement values and quality.

Figure 3:
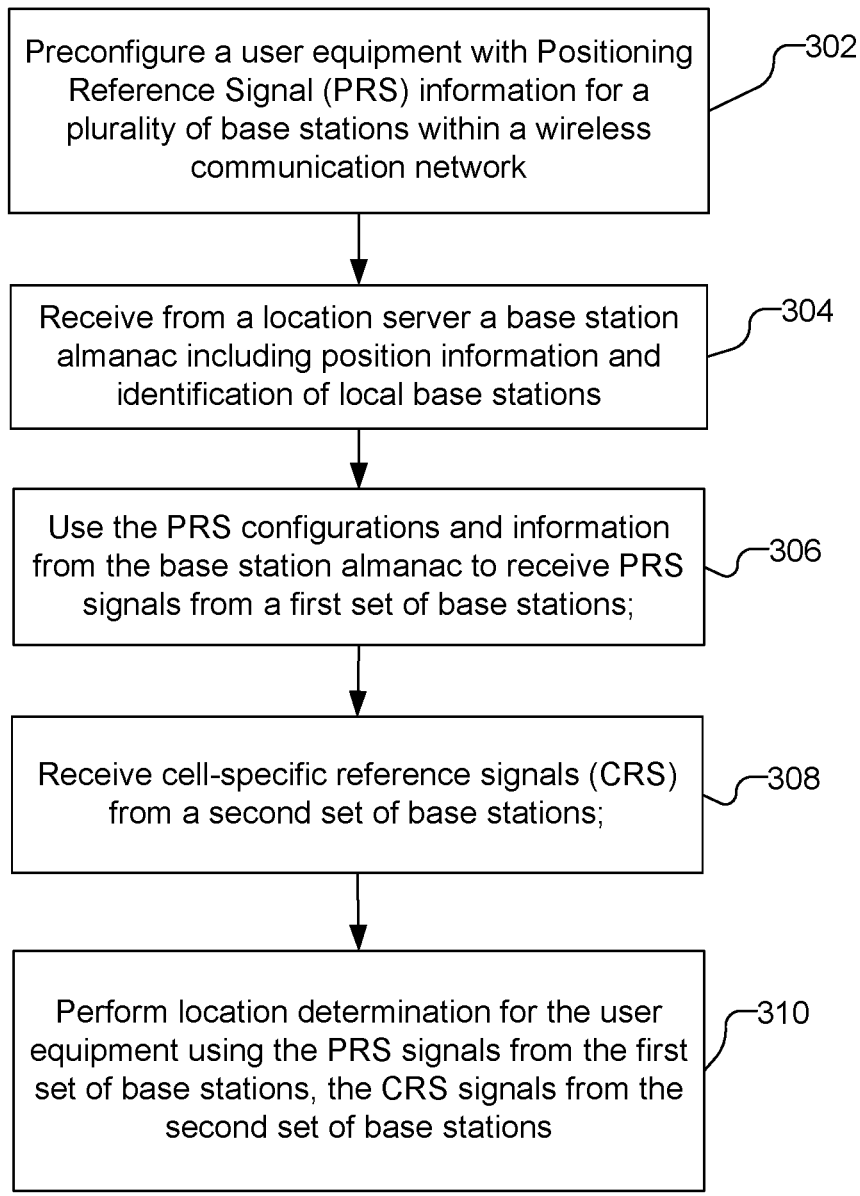
FIG. 3 is a flow chart illustrating a method of performing location determination with user equipment preconfigured with PRS configurations for base stations.

FIG. 3 is a flow chart illustrating a method of performing location determination with a user equipment. As illustrated, the user equipment is preconfigured with Positioning Reference Signal (PRS) configurations for a plurality of base stations within at least one wireless communication network (302). By way of example, the user equipment may be preconfigured with the PRS configurations for the plurality of base stations by storing the PRS configurations in a subscriber identify module (SIM) card. If desired, another storage mechanism may be used to preconfigure the user equipment with the PRS configurations. For example, the PRS configurations may be stored, e.g., by indexing by mobile country code (MCC) and mobile network code (MNC) to ensure that each carrier information is stored in the user equipment. The PRS configurations for the plurality of base stations may be, e.g., PRS Bandwidth, PRS Configuration Index, and Number of PRS Down-Link (DL) Frames and may additionally include Muting Information.

The user equipment receives from a location server a base station almanac with position information for local base stations (304). For example, the user equipment may transmit a base station identifier to the location server and receive the base station almanac including position information and identification of the local base stations in response. Using the PRS configurations and information from the base station almanac, the user equipment receives PRS signals from a first set of base stations (306). For example, as discussed above, using the stored PRS configurations and the identification of local base stations received in the base station almanac, the user equipment may determine the PRS transmission schedule for local base stations and may search for the PRS signals accordingly. The user equipment may use the position information of the local base stations to assist in the search for the PRS signals, e.g., to calculate an expected RSTD value (and uncertainty) associated with each neighbor base station, as discussed above. Thus, the user equipment may receive the PRS signals using the stored PRS configurations as well as information from the base station almanac provided in assistance data from the location server, but without receiving assistance data that includes the PRS configurations from a location server. The user equipment may additionally receive cell-specific reference signals (CRS) from a second set of base stations (308). The second set of base stations and the first set of base stations may include different base stations or may include at least one of the same base stations.

The user equipment performs location determination using the PRS signals from the first set of base stations and the CRS signals from the second set of base stations (31). The location determination may be further based on the position information for the local base stations received in the base station almanac. For example, the user equipment may determine ranging information to the first set of base stations using the PRS signals and may determine ranging information to the second set of base stations using the CRS signals. The ranging information to the first set of base stations and the ranging information to the second set of base stations and position information from the base station almanac for the base stations in the first set of base stations and the second set of base stations may be used to determine the location of the user equipment. The ranging information to the first set of base stations and the ranging information to the second set of base stations may be, e.g., time of arrival or time difference of arrival measurements. The user equipment may determine the location of the user equipment using the ranging information or may provide the ranging information to a location server, which may determine the location of the user equipment.

Figure 4:
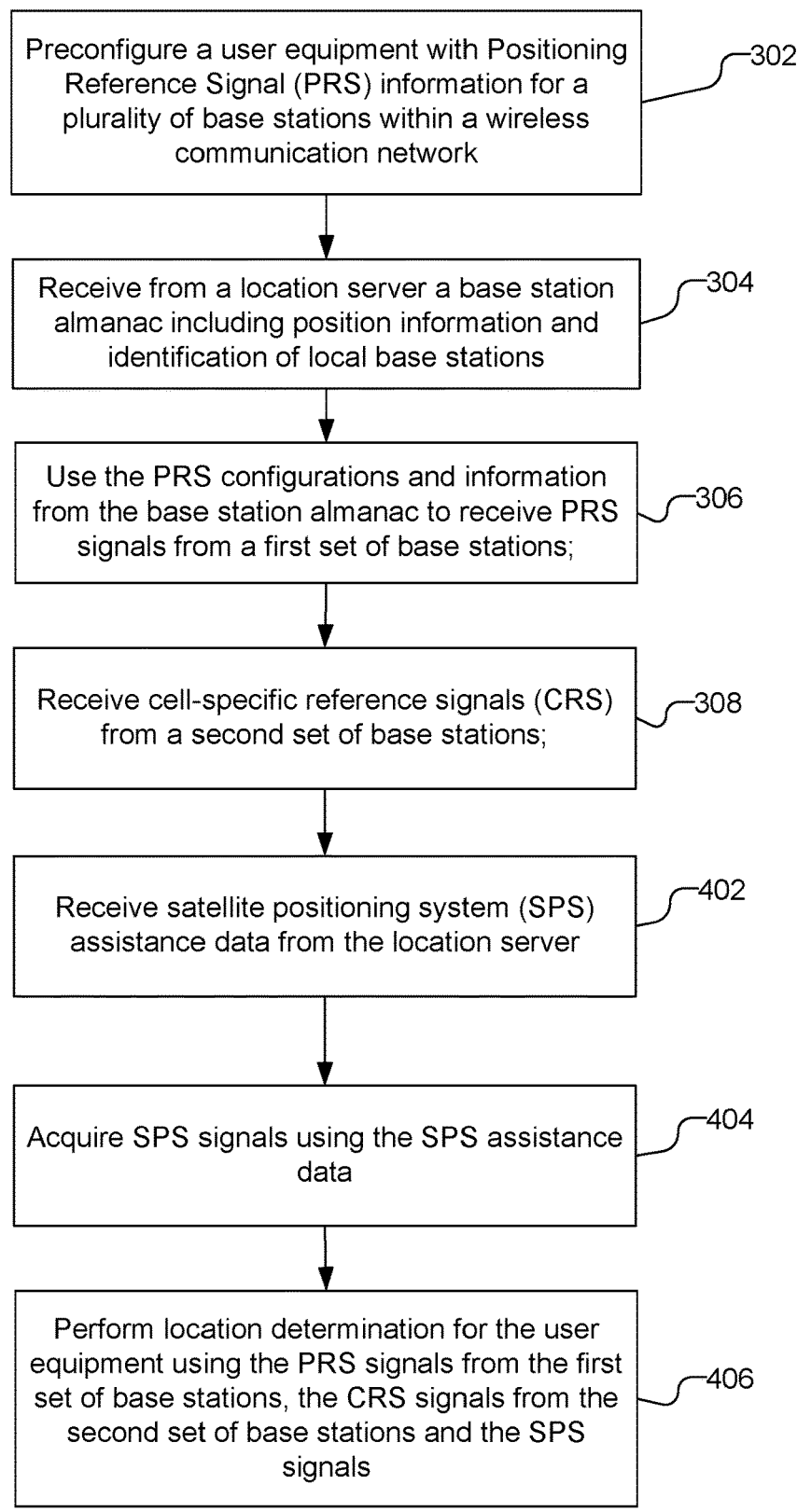
FIG. 4 is a flow chart illustrating another method of performing location determination with user equipment preconfigured with PRS configurations for base stations.

FIG. 4 is a flow chart, similar to that shown in FIG. 3, like designated elements being the same. As illustrated in FIG. 4, however, the user equipment may receive satellite positioning system (SPS) assistance data from the location server (402). The user equipment acquires SPS signals using the SPS assistance data (404). The user equipment performs location determination using the PRS signals from the first set of base stations, the CRS signals from the second set of base stations, and the SPS signals (406).

Figure 5:
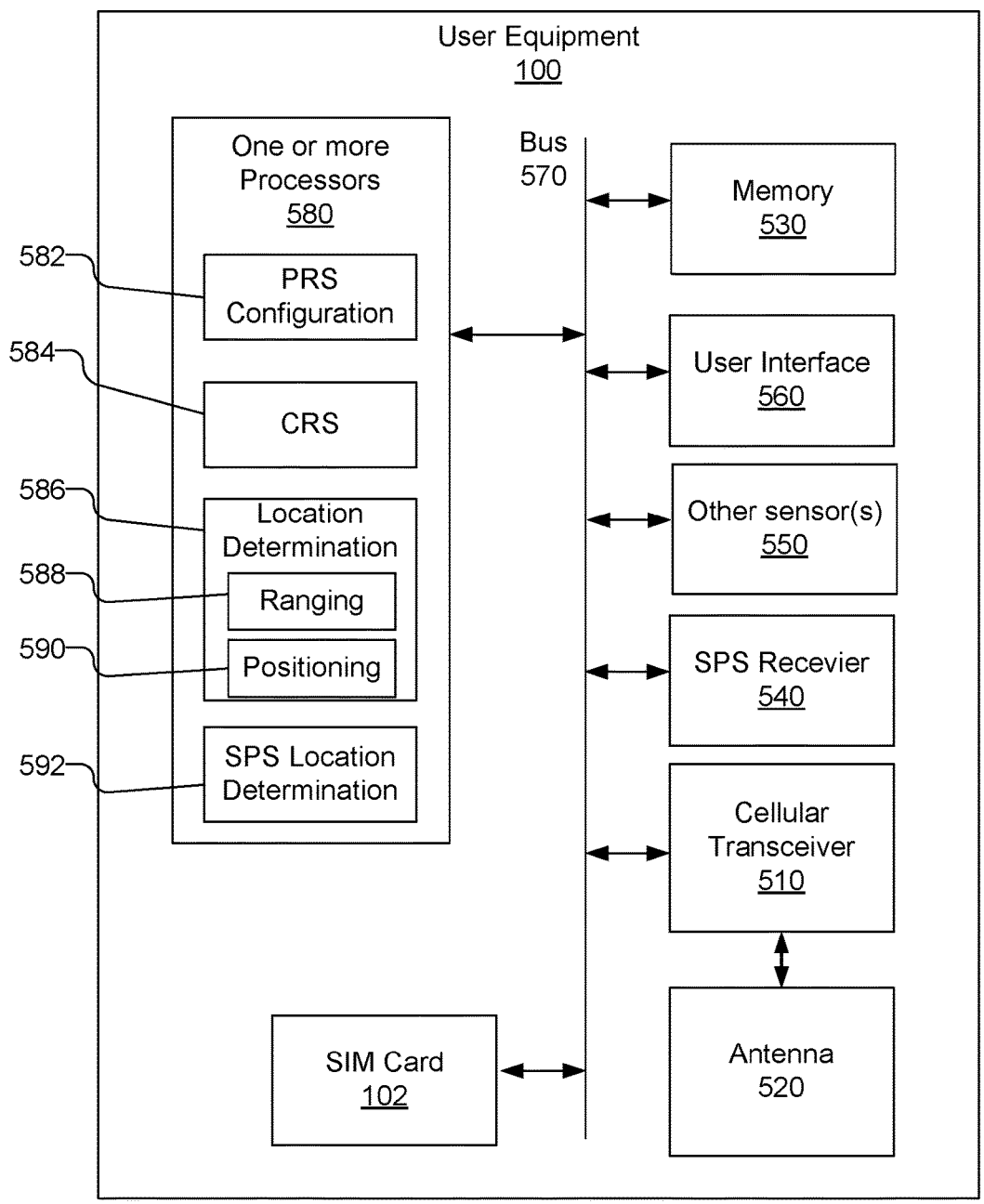
FIG. 5 is a block diagram of user equipment preconfigured with PRS configurations for base stations and capable of performing location determination using the PRS configurations.

FIG. 5 is a block diagram of UE 100 capable of performing location determination using PRS configurations with which the UE 100 is preconfigured to include. The UE 100 includes a cellular transceiver 510 configured to wirelessly communicate with and receive PRS signals and CRS signals from base stations 110 (shown in FIG. 1), and one or more antennas 520 that may be used with the cellular transceiver 510. The UE 100 is illustrated as including SIM card 102, which may store the PRS configurations for a plurality of base stations. Additionally, UE 100 includes memory 530, which may additionally or alternatively store PRS configurations for the plurality of base stations. The UE 100 may include an SPS receiver 540 with which SPS signals from SPS satellites 120 (shown in FIG. 1) may be received. The UE 100 may further include sensor(s) 550, such as accelerometers, gyroscopes, electronic compass, magnetometer, barometer, etc. The UE 100 100 may further include a user interface 560 that may include e.g., a display, a keypad or other input device, such as virtual keypad on the display, through which the user may interface with the UE 100.

The UE 100 further includes one or more processors 580, which may be coupled together with bus 570. The one or more processors 580 and other components of the UE 100 may similarly be coupled together with bus 570, a separate bus, or may be directly connected together or a combination of the foregoing. The memory 530 or different memory may contain executable code or software instructions that when executed by the one or more processors 580 cause the one or more processors to operate as a special purpose computer programmed to perform the algorithms disclosed herein.

The one or more processors 580 may include one or more processing units or components that implement the methodologies as described herein. For example, the one or more processors 580 may include a PRS configuration component 582 that is configured to determine cell-specific PRS configurations and PRS transmission schedules for local base stations based on the base station almanac provided in assistance data from a location server 130, e.g., received via the cellular transceiver 510, and the PRS configurations stored on the SIM card 102 (or memory 530). For example, the PRS configuration component 582 may determine the bandwidth used for PRS signals by a base station from PRS bandwidth that is included in the PRS configurations. Additionally, the PRS configuration component 582 may derive the PRS periodicity $T_{PRS}$ of positioning occasions and the PRS subframe offset $\Delta_{PRS}$, based on the PRS Configuration Index included in the PRS configurations. The number consecutive subframes $N_{PRS}$ in the positioning occasion may be determined based on the number of PRS DL frames included in the PRS configurations.

The one or more processors 580 may further include a CRS module 584 that is configured to detect CRS signals in wireless signals received from base stations by the cellular transceiver 510.

The one or more processors 580 may further include a location determination engine 586, to perform location determination based on the based on the received PRS signals and CRS signals. For example, the location determination engine 586 may include a ranging engine 588 to determine ranging information, such as the time of arrival or time difference of arrival using the PRS signals and CRS signals. The location determination engine 586 may include a positioning engine 590 that may use the ranging values along with the positions of the base stations from the base station almanac to determine the position of the UE 100, e.g., using multilateration. Alternatively, the positioning engine 590 may cause the cellular transceiver 510 to send the ranging values for a number of base stations to a location server 130 (shown in FIG. 1) to determine the position of the UE 100.

The one or more processors 580 may further include a SPS location determination engine 592 that is configured to perform location determination further based on the SPS signals received by the SPS receiver 540. For example, the SPS location determination engine 592 may determine the position of the UE 100 using the SPS signals. Alternatively, the SPS location determination engine 592 may cause the cellular transceiver 510 to send the SPS signals received by the SPS receiver 540 to the location server 130 (shown in FIG. 1) to determine the position of the UE 100.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 530, and are configured to cause the one or more processors to operate as a special purpose computer programmed to perform the algorithms disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, the UE 100 includes a means for preconfiguring a user equipment with Positioning Reference Signal (PRS) configurations for a plurality of base stations within at least one wireless communication network, which may include, e.g., the SIM card 102 or memory 530 storing the PRS configurations for the base stations. The UE 100 may further include means for receiving from a location server a base station almanac including position information and identification of local base stations, which may include the cellular transceiver 510. The UE 100 may further include means for using the PRS configurations and information from the base station almanac to receive PRS signals from a first set of base stations, which may include, e.g., the PRS configuration component 582 and the cellular transceiver 510. The UE 100 may further include means for receiving cell-specific reference signals (CRS) from a second set of base stations, which may include, e.g., the CRS module 584 and the cellular transceiver 510. The UE 100 may further include means for performing location determination for the user equipment using the PRS signals from the first set of base stations, the CRS signals from the second set of base stations, which may include, e.g., the location determination engine 586. For example, the location determination engine 586 may include means for determining ranging information to the first set of base stations using the PRS signals, which may include e.g., the ranging engine 588, and a means for determining ranging information to the second set of base stations using the CRS signals, which may include e.g., the ranging engine 588. The location determination engine 586 may further include means for using the ranging information to the first set of base stations and the ranging information to the second set of base stations and position information from the base station almanac for the base stations in the first set of base stations and the second set of base stations to determine the location of the user equipment, which may include e.g., the positioning engine 590. Additionally, the UE 100 may include means for transmitting a base station identifier to the location server, wherein the base station almanac with the position information for the local base stations is received from the location server in response to the base station identifier, which may include, e.g., the cellular transceiver 510.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method of performing location determination comprising:
   preconfiguring a user equipment with Positioning Reference Signal (PRS) configurations for a plurality of base stations within at least one wireless communication network;
   receiving from a location server a base station almanac including position information and identification of local base stations;
   using the PRS configurations and information from the base station almanac to receive PRS signals from a first set of base stations;
   receiving cell-specific reference signals (CRS) from a second set of base stations; and
   performing location determination for the user equipment using the PRS signals from the first set of base stations, the CRS signals from the second set of base stations.

2. The method of claim 1, wherein the information from the base station almanac used with the PRS configurations to receive the PRS signals from the first set of base stations comprises the identification of the local base stations.

3. The method of claim 2, wherein the information from the base station almanac used with the PRS configurations to receive the PRS signals from the first set of base stations further comprises the position information for local base stations.

4. The method of claim 1, wherein performing the location determination for the user equipment comprises:
   determining ranging information to the first set of base stations using the PRS signals;

determining ranging information to the second set of base stations using the CRS signals; and using the ranging information to the first set of base stations and the ranging information to the second set of base stations and the position information from the base station almanac for base stations in the first set of base stations and the second set of base stations to determine a location of the user equipment.

5. The method of claim 4, wherein the ranging information to the first set of base stations and the ranging information to the second set of base stations comprises one of time of arrival and time difference of arrival measurements.

6. The method of claim 1, further comprising transmitting a base station identifier to the location server, wherein the base station almanac including the position information and the identification of local base stations is received from the location server in response to the base station identifier.

7. The method of claim 1, further comprising receiving satellite positioning system (SPS) assistance data from the location server and acquiring SPS signals using the SPS assistance data, wherein performing the location determination for the user equipment further uses the SPS signals.

8. The method of claim 1, wherein the PRS configurations for the plurality of base stations with which the user equipment is preconfigured comprises PRS Bandwidth, PRS Configuration Index, and Number of PRS Down-Link (DL) Frames.

9. The method of claim 1, wherein the PRS configurations for the plurality of base stations with which the user equipment is preconfigured comprises Muting Information.

10. The method of claim 1, wherein preconfiguring the user equipment with the PRS configurations for the plurality of base stations comprises storing the PRS configurations in a subscriber identify module (SIM) card.

11. The method of claim 1, wherein the PRS configurations is for the plurality of base stations within a plurality of wireless communication networks having different carriers.

12. A user equipment for performing location determination comprising:

a memory preconfigured with Positioning Reference Signal (PRS) configurations for a plurality of base stations within at least one wireless communication network;

a cellular transceiver configured to wirelessly communicate with base stations; and at least one processor coupled to the memory and the cellular transceiver, the at least one processor configured to receive from the cellular transceiver a base station almanac transmitted by a location server, the base station almanac including position information and identification of local base stations, use the PRS configurations and information from the base station almanac to receive PRS signals from a first set of base stations with the cellular transceiver, receive cell-specific reference signals (CRS) from a second set of base stations with the cellular transceiver, and perform location determination using the PRS signals from the first set of base stations, the CRS signals from the second set of base stations.

13. The user equipment of claim 12, wherein the information from the base station almanac used with the PRS configurations to receive the PRS signals from the first set of base stations comprises the identification of the local base stations.

14. The user equipment of claim 13, wherein the information from the base station almanac used with the PRS configurations to receive the PRS signals from the first set of base stations further comprises the position information for local base stations.

15. The user equipment of claim 12, wherein the at least one processor is configured to perform the location determination by being configured to determine ranging information to the first set of base stations using the PRS signals, determine ranging information to the second set of base stations using the CRS signals, and use the ranging information to the first set of base stations and the ranging information to the second set of base stations and the position information from the base station almanac for base stations in the first set of base stations and the second set of base stations to determine a location of the user equipment.

16. The user equipment of claim 15, wherein the ranging information to the first set of base stations and the ranging information to the second set of base stations comprises one of time of arrival and time difference of arrival measurements.

17. The user equipment of claim 15, wherein the at least one processor is further configured to cause the cellular transceiver to transmit a base station identifier to the location server, wherein the base station almanac including the position information and the identification of local base stations is received from the location server in response to the base station identifier.

18. The user equipment of claim 15, further comprising:

a satellite positioning system (SPS) receiver for receiving SPS signals;

wherein the cellular transceiver receives SPS assistance data from the location server and the SPS receiver is configured to acquire the SPS signals using the SPS assistance data, wherein the at least one processor is configured to perform the location determination further based on the SPS signals.

19. The user equipment of claim 15, wherein the PRS configurations for the plurality of base stations preconfigured in memory comprises PRS Bandwidth, PRS Configuration Index, and Number of PRS Down-Link (DL) Frames.

20. The user equipment of claim 15, wherein the PRS configurations for the plurality of base stations preconfigured in the memory comprises Muting Information.

21. The user equipment of claim 15, wherein the memory preconfigured with the PRS configurations for the plurality of base stations comprises a subscriber identify module (SIM) card.

22. The user equipment of claim 15, wherein the PRS configurations is for the plurality of base stations within a plurality of wireless communication networks having different carriers.

23. A user equipment for performing location determination comprising:

means for preconfiguring the user equipment with Positioning Reference Signal (PRS) configurations for a plurality of base stations within at least one wireless communication network;

means for receiving from a location server a base station almanac including position information and identification of local base stations;

means for using the PRS configurations a and information from the base station almanac to receive PRS signals from a first set of base stations;

means for receiving cell-specific reference signals (CRS) from a second set of base stations; and means for performing location determination for the user equipment using the PRS signals from the first set of base stations, the CRS signals from the second set of base stations.

24. The user equipment of claim 23, wherein the means for performing the location determination comprises:
   means for determining ranging information to the first set of base stations using the PRS signals;
   means for determining ranging information to the second set of base stations using the CRS signals; and
   means for using the ranging information to the first set of base stations and the ranging information to the second set of base stations and the position information from the base station almanac for base stations in the first set of base stations and the second set of base stations to determine a location of the user equipment.

25. The user equipment of claim 23, wherein the PRS configurations for the plurality of base stations with which the user equipment is preconfigured comprises PRS Bandwidth, PRS Configuration Index, and Number of PRS Down-Link (DL) Frames.

26. The user equipment of claim 23, wherein the PRS configurations for the plurality of base stations with which the user equipment is preconfigured comprises Muting Information.

27. A non-transitory computer-readable medium for performing location determination by a user equipment, wherein the user equipment is preconfigured with Positioning Reference Signal (PRS) configurations for a plurality of base stations within at least one wireless communication network, the non-transitory computer-readable medium including program code stored thereon, comprising:
   program code for receiving from a location server a base station almanac including position information and identification of local base stations;
   program code for using the PRS configurations and information from the base station almanac to receive PRS signals from a first set of base stations;
   program code for receiving cell-specific reference signals (CRS) from a second set of base stations; and
   program code for performing location determination for the user equipment using the PRS signals from the first set of base stations, the CRS signals from the second set of base stations.

28. The non-transitory computer-readable medium of claim 27, wherein the means for performing the location determination comprises:
   program code for determining ranging information to the first set of base stations using the PRS signals;
   program code for determining ranging information to the second set of base stations using the CRS signals; and
   program code for using the ranging information to the first set of base stations and the ranging information to the second set of base stations and the position information from the base station almanac for base stations in the first set of base stations and the second set of base stations to determine a location of the user equipment.

29. The non-transitory computer-readable medium of claim 27, wherein the PRS configurations for the plurality of base stations with which the user equipment is preconfigured comprises PRS Bandwidth, PRS Configuration Index, and Number of PRS Down-Link (DL) Frames.

30. The non-transitory computer-readable medium of claim 27, wherein the PRS configurations for the plurality of base stations with which the user equipment is preconfigured comprises Muting Information.

* * * * *